United States Patent [19]

Korpan

[11] Patent Number: 4,784,109
[45] Date of Patent: Nov. 15, 1988

[54] GRID SYSTEM

[76] Inventor: Brian A. Korpan, 540 Garfield St., New Westminster, B.C., Canada, V3L 4A7

[21] Appl. No.: 71,023

[22] Filed: Jul. 8, 1987

[51] Int. Cl.[4] .............................................. A47J 37/00
[52] U.S. Cl. ................................ 126/25 R; 126/39 M; 99/450
[58] Field of Search .................... 126/164, 165, 25 R, 126/25 A, 9 R, 9 A, 9 B, 29, 30; 99/445–450

[56] References Cited

U.S. PATENT DOCUMENTS

| | | | |
|---|---|---|---|
| 1,912,886 | 6/1933 | Buckley | 126/167 |
| 3,082,757 | 3/1963 | Hohe | 126/25 R |
| 3,225,682 | 12/1965 | Savio | 99/450 |
| 3,509,814 | 5/1970 | Karapetian | 126/25 R |
| 3,555,994 | 1/1971 | Hemetz | 126/25 R |
| 3,717,083 | 2/1973 | Karapetian | 126/25 R |

FOREIGN PATENT DOCUMENTS 718268 11/1954 United Kingdom .................. 99/450

*Primary Examiner*—James C. Yeung

[57] ABSTRACT

A grid system comprises a cover holder (26) to which a replaceable cover (28) can be fitted to by a sliding engagement. The holder (26) comprises a plurality of identical elongated T-shaped bars (30) being aligned parallel to one another on an equal plane, spaced equally apart, and being supported by two elongated retangular shaped front and rear crossbars (32,34) respectively. The front crossbar (32) having centrally located on its top side a small elongated extensible bar (52) and a bracket (54), which is used to support the front end of the bars (30) above an opposing member to facilitate fitting or removal of the replaceable cover (28). The replaceable cover (28) comprises a plurality of identical elongated generally retangular shaped sleeves (66) being aligned parallel to one another on an equal plane, spaced equally apart, and held in place by two margins (68) crossing perpendicular at the ends of sleeves (66), and on the same plane as the tops of sleeves (66). The replaceable cover (28) can be fitted to the cover holder (26) by placing a margin (68) perpendicular to and on top of the front ends of bars (30) and aligning each sleeve (66) with its corresponding bar (30), the replaceable cover (28) can then be slid on to the holder (26) having the sleeves (66) slidingly engaged by the upper portion (42) of the bars (30).

4 Claims, 4 Drawing Sheets

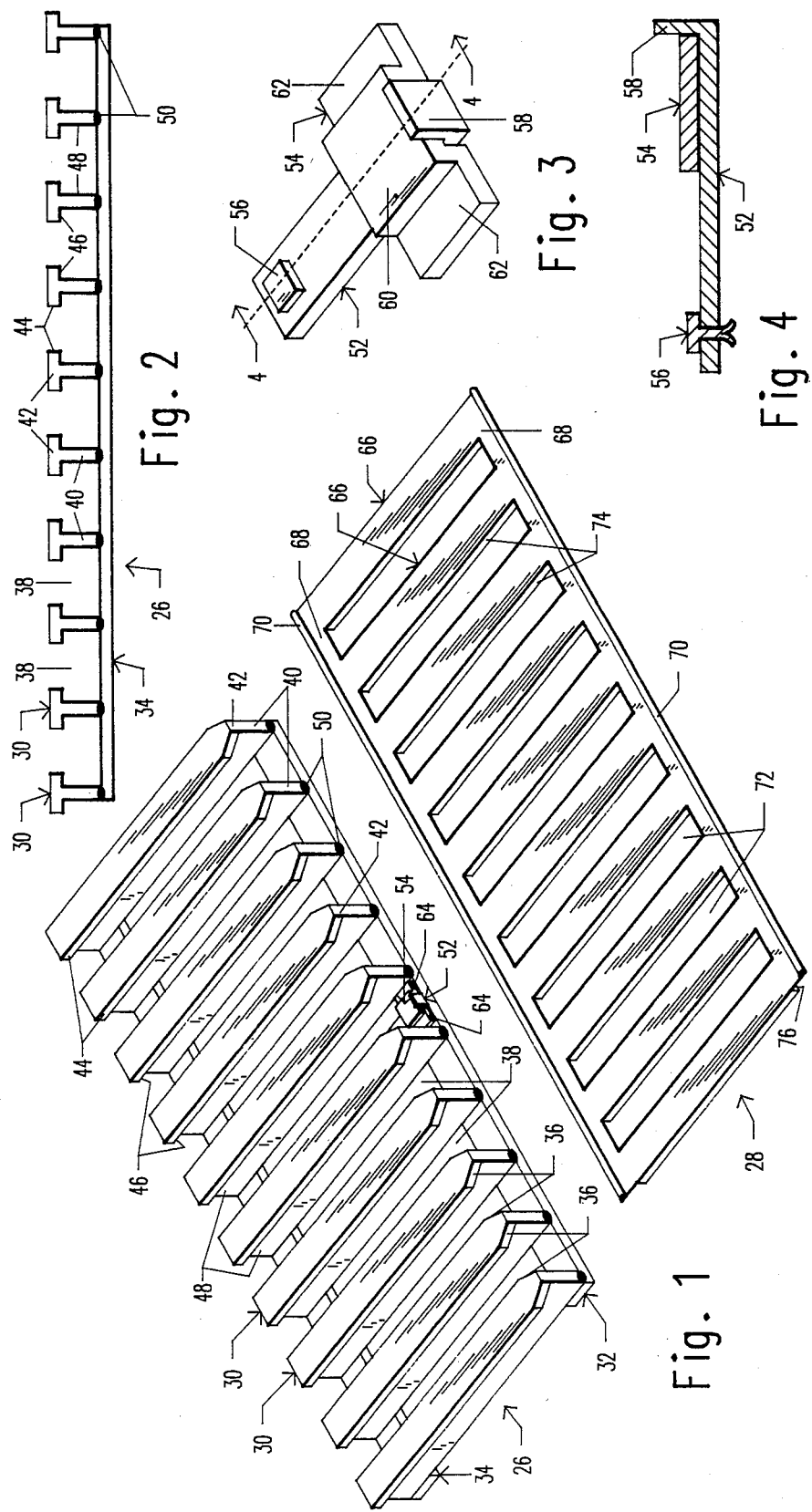

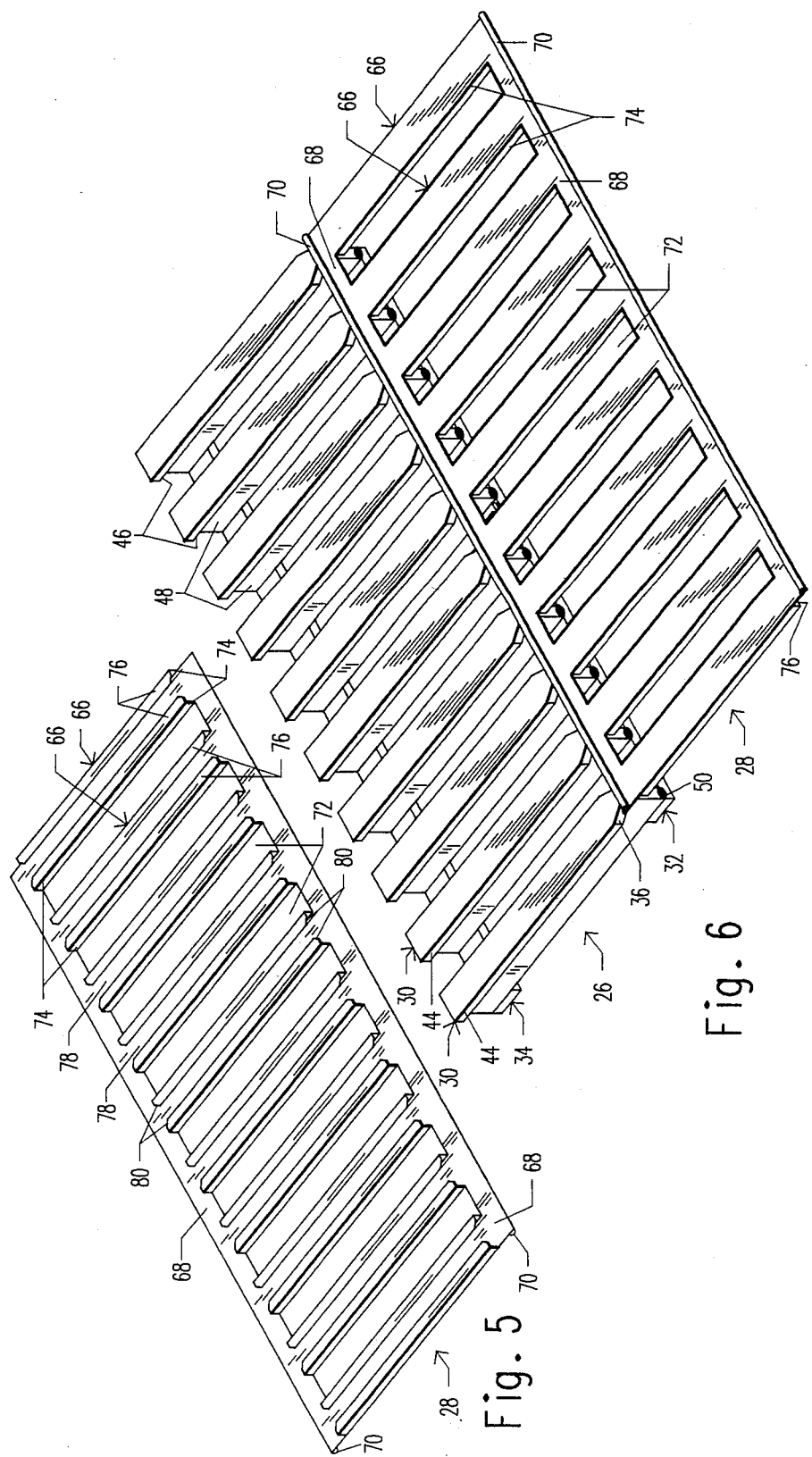

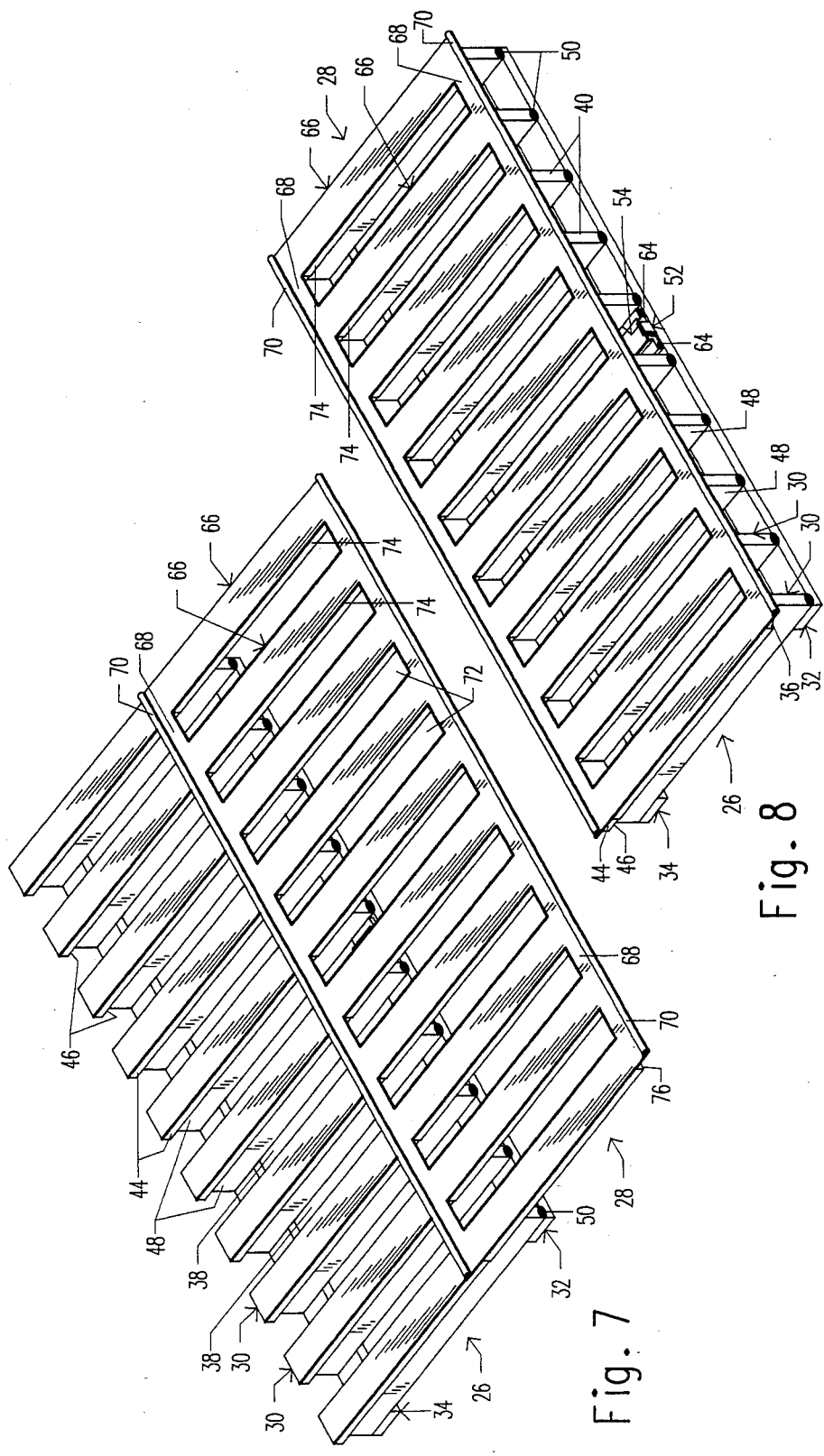

GRID SYSTEM

BACKGROUND

1. Field of Invention

This invention relates to grid systems comprising a cover holder and a replaceable cover, especially to grid systems comprising a cover holder and a replaceable cover which is used as the cooking grid in barbecue grills, and gas barbecues. The replaceable cover being used as the cooking surface, and, after becoming soiled or at will can be removed and replaced with a new replaceable cover.

2. Description of Prior Art

Many, if not all users of cooking grids prefer to cook food on a clean surface.

Heretofore variations on one basic type of cooking grid have been proposed and implemented for use in barbecue grills, and gas barbecues.

This basic grid consists of a plurality of parallel bars, spaced apart from one another, and fixed on an equal plane the outer most surface providing the cooking surface on which food is supported. After this type of grid has been used, to clean it thoroughly requires the transfer of the grid to a suitable cleaning area such as a sink. Then a messy, difficult, and time consuming process of scraping and scrubbing is required to thoroughly clean the grid.

What makes this type of grid so difficult to clean is a combination of factors. First, the food residue left on the grid after use is usually burnt on, thus, it is hard to remove and necessitates cleaning by hand. Second, the spaces between the bars necessitates a cleaning action along the length of the bars usually one bar at a time, because a cleaning action perpendicular to the bars causes water, suds, etc. to be sprayed into the air and often on to the user, walls, counter tops, the floor, etc., creating a considerable mess. Third, the weight of the grids make them hard to handle. Fourth, the size of the grids is often too large to fit completely into a standard sized sink. Finally, barbecue grills and gas barbecues are usually kept outdoors. The significance of this is that after preparing food using the barbecue the user proceeds to eat. After eating, the barbecue is stored until the next time it is required, thus, the soiled grid is not out in the open reminding the user to clean it, but rather, the soiled grid is forgotten about until the next time the barbecue is to be used. At that time it is unlikely the user would want to delay barbecuing for up to twenty minutes in order to clean the cooking grid. As a result of these factors users found this type of cooking grid unsatisfactory.

Due to the difficulty of cleaning this type of grid various wire brushes and the like have been proposed and implemented for cleaning the grid in place in the barbecue unit. Using this type of cleaning method, however, is deemed unsatisfactory by users because it is time consuming, it can be physically demanding, and further, it removes only the thicker residue, thus, leaving behind a greasy charred residue on the grid. In addition, the residue removed is deposited in the body of the barbecue where in the case of gas barbecues it can damage the burner unit.

Some users, because of the difficulty cleaning this type of grid thoroughly with soap and water and the inadequacies of brush cleaning don't clean their grids, thus, allowing charred cooking residue to build up until eventually they must at their own expense either replace the old grid with a new one or spend a great deal of time and effort to try and salvage the old grid.

In essence, users found this type of grid unsatisfactory because of the difficulty cleaning it thoroughly and the difficulties and inadequacies of other cleaning methods.

A variation of the basic grid was to cut larger grids into two or more pieces, however, the basic cleaning difficulties remained requiring the use of the unsatisfactory cleaning procedures used on the basic grid. Users, thus, found this variation unsatisfactory.

Another variation of the basic grid was to coat the grid in porcelain instead of chrome. The porcelain, however, becomes coated with residue during use similar to the basic grid. Again this variation still requires the unsatisfactory cleaning procedures as the basic grid, and thus, was found to be unsatisfactory by users.

Most users, therefore, would find it desirable to have a cooking grid which could provide a clean cooking surface more easily.

BRIEF SUMMARY—OBJECTS AND ADVANTAGES

Accordingly several objects and advantages of my invention are: to provide a novel grid system for easily, reliably, neatly, quickly, and conveniently providing a clean cooking surface, to provide a grid system which requires a minimum of skill and training to use, to provide a grid system which completely eliminates the need to waste time and energy to perform the difficult and frustrating job of cleaning a cooking grid.

In addition, more objects and advantages of my invention are: to provide a grid system compatible with barbecue grills, gas barbecues, broiler pans etc., to provide a grid system that can improve the taste and appearance of foods prepared on it by easily providing a clean cooking surface, thus, eliminating contact between freshly prepared foods and old cooking residue, to provide a grid system that may result in health benefits, because scientific studies have shown that carcinogenic substances can be produced in burnt food, and since many users of unsatisfactory prior art cooking grids are cooking food on a surface covered in old burnt food residue their health may be at risk, thus, because my invention provides an easier way to obtain a clean cooking surface proper use of my invention will eliminate contact between fresh food and old burnt cooking residue, therefore, health benefits may result for users of my invention.

Readers will find further objects and advantages of my invention from a consideration of the ensuing description and the accompanying drawings.

BRIEF DESCRIPTION OF DRAWING FIGURES

FIG. 1 shows a perspective view of a cover holder and a replaceable cover according to the invention.

FIG. 2 shows a back end elevation view of the cover holder of FIG. 1.

FIG. 3 shows an enlarged perspective view of the extensible bar and bracket of the cover holder of FIG. 1.

FIG. 4 shows a cross section view of the extensible bar and bracket along the line 4—4 of FIG. 3.

FIG. 5 shows a perspective view of the underside of the replaceable cover of FIG. 1.

FIG. 6 shows a perspective view of the introduction of the replaceable cover to the cover holder both of FIG. 1.

FIG. 7 shows a perspective view of the replaceable cover being partially fitted to the cover holder both of FIG. 1.

FIG. 8 shows a perspective view of the replaceable cover being fully fitted to the cover holder both of FIG. 1.

Figure 9:
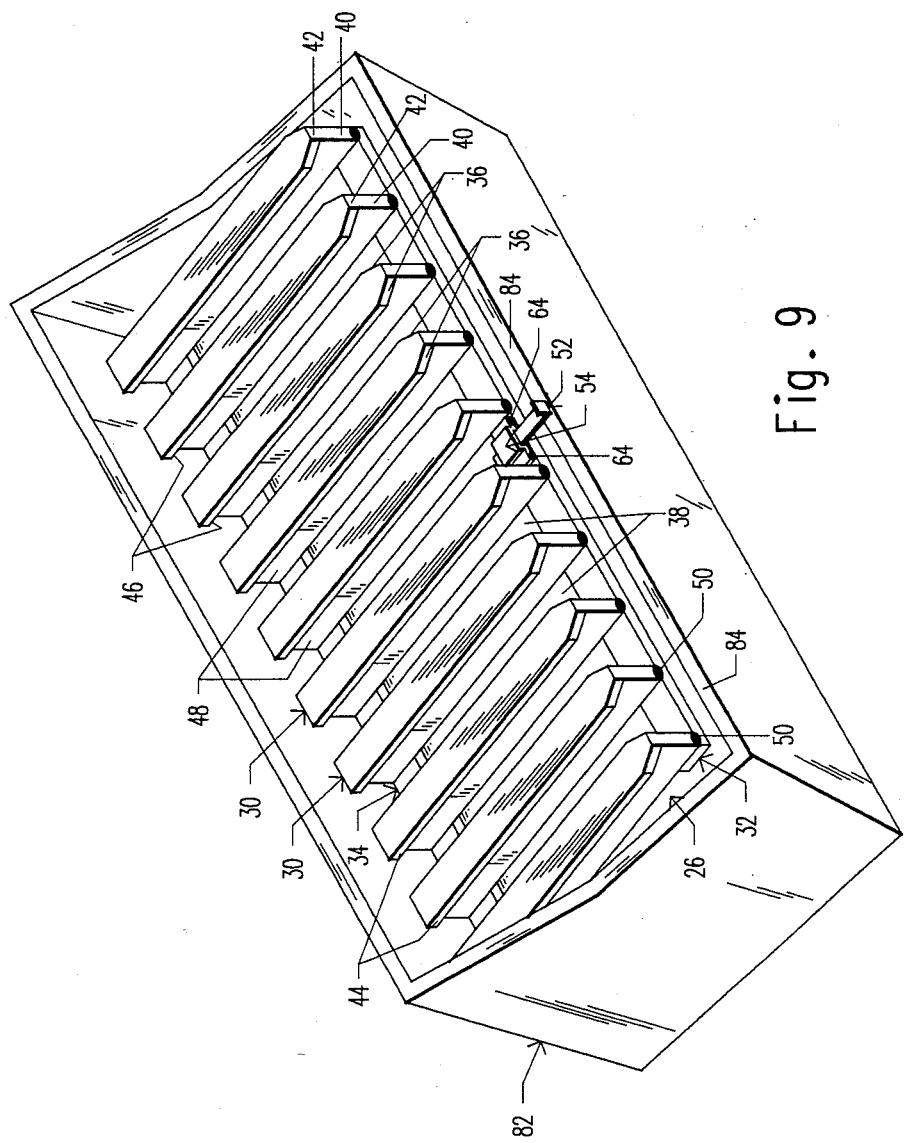
FIG. 9 shows a perspective view of a barbecue units upper body having the cover holder of FIG. 1 in place with its front portion supported above the front member of said body by the extensible bar of FIG. 1 being in an extended position.

Drawing Reference Numerals 26 cover holder
28 replaceable cover
30 bars
32 front crossbar
34 rear crossbar
36 beveled corners of 30
38 gaps between 30
40 lower portion of 30
42 upper portion of 30
44 side of 42
46 bottom of 42
48 side of 40
50 T-joint spot welds joining 30 to 32 and 34
52 extensible bar
54 bracket
56 pin of 52
58 frontal projection of 52
60 inverted U-shaped portion of 54
62 flanges of 54
64 lap joint spot welds between 62 and 32
66 sleeves
68 margins
70 wired edges
72 gaps between 66
74 sides of 66
76 opposing inwardly directed members of 66
78 gaps between 76
80 beveled corners of 76
82 barbecue unit upper body
84 opposing front member of 82

DESCRIPTION OF PREFERRED EMBODIMENT

FIG. 1 shows a perspective view of the cover holder 26 and the replaceable cover 28 according to the preferred embodiment of the invention. The holder 26 comprises a plurality of elongated T-shaped bars 30, preferably made of an aluminium alloy, and each having two beveled corners 36 located on the upper portion 42 and front end of each bar 30. The beveled corners 36 help to align and ease the sliding engagement of the replaceable covers elongated generally retangular shaped sleeves 66 with the upper portion 42 of the bars 30. The bars 30 are equal lengths and are aligned parallel to one another on an equal plane and are spaced equally apart creating gaps 38. The T-shape of each bar 30 is illustrated best in FIG. 2 which is a back end elevation view of the holder 26 of FIG. 1. The two main portions of each bar 30 is the upper portion 42 and the lower portion 40. The upper portion 42 to be slidingly engaged by the replaceable covers generally rectangular shaped sleeves 66 of FIGS. 1, 5, 6, 7, and 8.

The bars 30 are held in place by a front crossbar 32 and a rear crossbar 34 which are both elongated retangular shaped bars with uniform sections throughout their entire lengths and which are preferably made of an aluminium alloy. The application of the bottoms of the front and back ends of bars 30 to the top of the front and rear cross bars 32 and 34 respectively, forms T-joints which are spot welded 50 being indicated by the symbol for a spot weld from Patent and Trademark Office: Guide For Patent Draftsman: Washington, D.C., U.S. Government Printing Office, 1975.

Again referring to FIG. 2 the gaps 38 between the bars 30 and in particular the width of the gaps 38 between the sides 44 of the bars 30 is determined mainly by the dimensions of the bars 30. The width of the gaps 38 can be as wide as is practical, however, they must not be too narrow because the replaceable cover 28 is a one piece construction. For example, the replaceable cover 28 could be constructed by folding a piece of reasonably strong and rigid aluminum foil over a form modeled after the cover holder 26 but having slightly larger dimensioned bars 30 to insure that the replaceable cover 28 resulting is large enough so that the sliding engagement of the replaceable cover 28 to the cover holder 26 does not produce excessive friction. Before folding the piece of foil over the form the foil is first cut in a pattern so that when it is placed on top of the form covering the tops of the bars 30 and the gaps 38 between them the cuts in the foil are down the middle of the foil covering the gaps 38 parallel to the bars 30. The foil on either side of the cuts and the foil extending beyond the outside edges of the extreme right and left bars 30 would then be folded down and over the sides 44 and bottom sides 46 of the bars 30. Thus, the gaps 38 must be wide enough to insure enough foil is available to cover sufficiently the sides 44 and bottom sides 46 of the bars 30 adjacent the gaps 38.

Located on the top of the front crossbar 32 between two centrally located bars 30 and illustrated best in FIGS. 3 and 4 is a means for supporting the front end of bars 30 above an apposing member in order to facilitate the fitting of the replaceable cover 28 to the holder 26. It is comprised of an extensible bar 52 and bracket 54. The extensible bar is a small retangular shaped elongated bar preferably made of an aluminium alloy, having a pin 56 which is inserted in a hole at the back end portion of the extensible bar 52 which prevents the extensible bar 52 from being pulled free from the bracket 54, and a frontal projection 58 which is an upward right angle bend of the front end portion of the extensible bar 52 the end of which projects above the top of the bracket 54 but not so high as to interfere with the application of the replaceable cover 28. The frontal projection 58 can be grasped and pulled by the user to put the extensible bar 52 in an extended position, see FIG. 9, or pushed to put the extensible bar 52 in a retracted position while preventing the extensible bar 52 from being pushed free from the bracket 54.

The bracket 54 is a one piece construction preferably made of an aluminium alloy. The bracket 54 provides a guide and holder for the extensible bar 52 while allowing the extensible bar 52 to be extended and retracted. It is comprised of a central portion 60 which is inverted U-shaped, and two flanges 62 one on either side of the inverted U-shaped portion 60. The bracket 54 is attached to the front cross-bar 32 by spot welds 64 indicated by the symbol for a spot weld from Patent and Trademark Office: Guide For Patent Draftsman: Washington, D.C., U.S. Government Printing Office, 1975. The spot welds 64 are placed in the lap joints formed by the flanges 62 and the top of the front crossbar 32, see FIG. 1. The lenght of the shortest sides of the bracket 54 is less than the width of the surface of the front crossbar 32 on which it located. The bracket 54 is positioned so that the long side at the back of the bracket 54 is flush to the back edge of the front crossbar 32, thus, leaving the long side at the front of the bracket 54 indented sufficiently throughout its lenght so that when the extensible bar 52 is in its fully retracted position, illustrated best in FIG. 3, the front edge of the frontal projection 58 does not extend beyond the front edge of the front crossbar 32.

The entire cover holder 26 including the extendsible bar 52 and bracket 54 can be treated with suitable platings or coatings to enhance durability, however, this is not a necessity.

The dimensions of the cover holder 26 are determined by the specific application.

The replaceable cover 28 of FIG. 1 is also shown in a perspective view of its underside in FIG. 5, and top perspective views in FIGS. 6, 7, and 8. The replaceable cover 28 is a one piece construction preferably made of reasonably strong and rigid aluminum foil, it mainly comprises a plurality of identical elongated generally retangular shaped sleeves 66 all aligned parallel to one another on an equal plane and spaced equally apart creating gaps 72. The sleeves 66 are the female part of the engagement between the replaceable cover 28 and holder 26, the upper portion 42 of the bars 30 being the male part of the engagement.

Shown best in FIG. 5 are specified features of the sleeves 66. From the top (bottom in FIG. 5) of the sleeves 66 extending downward (upward in FIG. 5) at right angles are sides 74. Extending inwardly at right angles from the sides 74 are opposing inwardly directed members 76 each having beveled corners 80 at both end. Centrally located between the members 76 are gaps 78 which run the entire lenght of the sleeves 66.

When the replaceable cover 28 is fully engaged with the holder 26, illustrated in FIG. 8, the sleeves 66 effectively cover the tops, sides 44, and bottom sides 46 of the bars 30 over the length of the sleeves 66 which is the distance between the inside edges of the margins 68. Although the tops and sides 74 of the sleeves 66 completely cover the tops and sides 44 of the bars 30 over the lenght of the sleeves 66, the opposing inwardly directed members 76 do not completely cover the bottom sides 46 of the bars 30. The gaps 78 between the opposing inwardly directed members 76 is wider than the lower portion 40 of the bars 30 so that during the sliding engagement the opposed inside edges of the members 76 do not come in contact with the sides 48 of the bars 30, thus, preventing unwanted friction points. As mentioned earlier another way engagement friction is reduced is that the top and sides 74 of the sleeves 66 are wider than the surfaces they cover namely the tops and sides 44 of the bars 30.

The bevels 80 on both ends of each opposing inwardly directed member 76 help to guide and ease the engagement of the lower portion 40 of the bars 30 into the gaps 78 of the sleeves 66.

Two margins 68 one at each end of the sleeves 66 are perpendicular to the sleeves 66 and on the same plane as the tops of sleeves 66 which join the inside edges of the margins 68 at both ends of the sleeves 66, thus holding the sleeves 66 in place. FIG. 6 shows a perspective view of the introduction of the replaceable cover 28 to the holder 26. The bottom side of either margin 68 is placed on top of the top front portion of bars 30, this sets the cover 28 on the correct plane for the sliding engagement, and aids the user in aligning each sleeve 66 with its corresponding bar 30.

The structure of the sleeves 66 make the replaceable cover 28 quite rigid over the length of the sleeves 66. To make the replaceable cover rigid over its length perpendicular to the sleeves 66, the outside edge of each margin 68 is a wired edge 70. In this application, however, wires inside the edges are not necessary.

The dimensions of the replaceable cover 28 are determined by the dimensions of the holder 26.

OPERATION OF PREFERRED EMBODIMENT

The cover holder 26 having a replaceable cover 28 shown in perspective views in FIGS. 1, 6, 7, and 8 is one embodiment which is suitable for use in many barbecue grills, and most gas barbecues. These applications are such that when a cooking grid is installed in a unit it is usually supported by at least two small ledges on which the bottoms of crossbars 32 and 34 would rest.

Installation of the holder 26 simply requires the user to lift out the old cooking grid, if one is in place, and replace it with a relevant sized holder 26 having its top side facing up and the front crossbar 32 at the front of the unit, and the bottoms of the crossbars 32 and 34 resting on the supporting ledges. In many of the applications cited the holder 26 resting on the supporting ledges would be held on a plane inside a body 82 surrounded by opposing members, as illustrated in FIG. 9.

The best method to apply a replaceable cover 28 to the holder 26 in applications similar to that illustrated in FIG. 9 is as follows: First, the user must make sure that the unit is not emitting any heat and that the holder 26 is cool enough to be handled. Second, with one hand the user will grasp the upper portion 42 of a central bar. 30 near its front end and then lift the front of the holder 26 and in particular the front crossbar 32 above the opposing front member 84 while the rear crossbar 34 remains on its supporting ledge and acts as a pivot point. While holding the holder 26 in this position the user with his other hand then grasps the frontal projection 58 of the extensible bar 52 and pulls the extensible bar 52 into its fully extended position. Third, the user lowers the front of the holder 26 so that the bottom of the extensible bar 52 rests on the top of the opposing front member 84, see FIG. 9. This position leaves the front crossbar 32 below the opposing front member 84, thus, preventing the holder 26 from being able to be pulled forward and free of the body 82, while also elevating the front of bars 30 above the opposing front member 84. This frees the users hands to fit a replaceable cover 28 to the holder 26.

Fourth, the user holds the replaceable cover 28 with its top facing up and places either margin 68 parallel to the front crossbar 32 and on top of the front end of the bars 30. Either margin 68 can be used as the leading edge because both halves of the replaceable cover 28 divided parallel to the margins 68 are identical. Now the user aligns the replaceable cover 28 so that each sleeve 66 is in line with its corresponding bar 30, as shown in FIG. 6. The margin 68 resting on top of the bars 30 automatically sets the correct height for the cover 28 to be slidingly engaged on to the holder 26. Fifth, while holding the replaceable cover 28 on the same plane as the holder 26, the user then pushes it on to the holder 26 by its outside wired edge 70, see FIG. 7. Finally, with the replaceable cover 28 fully fitted to the holder 26, see FIG. 8, the user grasps the front upper portion 42 of a central bar 30, now covered by the replaceable cover 28, and lifts the front of the holder 26 off the opposing front member 84. The user then retracts the extensible bar 52 by pushing on the frontal projection 58 and then lowers the front crossbar 32 of the holder 26 on to its supporting ledge in the body 82. The holder 26 with the replaceable cover 28 fitted to it, forms an operative cooking grid that is ready for use.

To remove a replaceable cover 28 from the holder 26 the user completes the first three steps above. Then the user grasps the replaceable cover 28 by its outside wired edge 70 at the front of the holder 26, and then pulls the cover 28 towards himself on the same plane as the holder 26.

In some of the applications cited the opposing front member 84 of the body 82 is low enough so that when the holder 26 is in position in the unit's body resting on its supporting ledges the opposing front member only obstructs the front crossbar 32 and perhaps the lower part of the lower portion 40 at the front of the bars 30. This usually provides enough clearance for removing or fitting a replaceable cover 28 without having to elevate the front of the cover holder 26.

While the above description contains many specifities, the reader should not construe these as limitations on the scope of the invention, but merely as exemplifications of preferred embodiments thereof. Those skilled in the art will envision many other possible variations that are within its scope. For example, skilled artisans will readily be able to change the dimensions and shapes of the various embodiments. They will be able to make the holder and replaceable cover of alternate materials, such as other metals, ceramics, and even some plastics. They can put different platings or coatings on the holder, for example, porcelain. They could make the holder and replaceable cover in a combination of pieces. They could change the number of bars, crossbars, etc., and could also change there dimensions and shapes.

They could cast the holder in one piece or use bonding alternatives to welding. They could make the holder to be supported in a barbecue units body by more than two ledges or by using a central post or by cantilevering the holder etc. They could construct the replaceable cover out of separate joined pieces rather than one piece. They could eliminate the extensible bar and bracket leaving it to the user to locate the holder in a position to facilitate fitting and removal of the replaceable cover, or they could change the dimensions and shape of the extensible bar and bracket, or provide another means attached to the holder for supporting the front of the bars above an opposing member.

Another alternative to a means attached to the holder for supporting the front of the bars above an opposing member is to provide the user with a separate bracket having a projecting ledge. After the front of the holder has been raised above an opposing front member of a units body the bracket would be hung on the opposing member with its projecting ledge facing the holder. Then when the front of the holder is lowered the bottom of its front crossbar will rest on the brackets projecting ledge, thus, being supported with the front end of its bars above the opposing member of the unit.

My invention can also be mated with a broiler pan for oven cooking and can be altered to perform functions other than providing a clean cooking grid surface. Those skilled in the art would readily be able to adapt my invention to other grid like structures. For example, by adding a flange around the perimeter of the holder on the same plane as the crossbars, and also obstructing the back end of each bar, the resulting grid system comprising a holder and a replaceable cover could be used to replace vent registers or grills etc., for applications in which the outer surface of the register or grill becomes incrusted with a residue which must be removed periodically. In fact, almost any grid like structure could be replaced by an embodiment of my invention, whether for cooking or otherwise.

Accordingly, the reader is requested to determine the scope of my invention by the appended claims and their legal equivalents, and not by the examples which have been given.

I claim:

1. A barbecue or broiling grid system comprising a replaceable cover, a cover holder, and an engagement means for releaseably interconnecting said replaceable cover with said cover holder by a longitudinal sliding motion, said cover holder comprising a plurality of spaced apart supporting bars, said replaceable cover comprising a plurality of spaced apart open sleeves, said bars and said sleeves being shaped relative to one another to permit said sleeves to be longitudinally fitted to or removed from said bars, each of said bars provided with longitudinal outwardly projecting members, each of said sleeves provided with longitudinal opposed inwardly directed members which engage said outwardly projecting members of said bars when said replaceable cover is pushed longitudinally on to said cover holder forming an operative grid, whereby: in the event of said operative grid becoming soiled said replaceable cover can be removed from said cover holder by a longitudinal sliding motion and a new replaceable cover can be fitted to said cover holder by a longitudinal sliding motion to provide at least one clean outer surface on said operative grid.

2. The grid system of claim 1 wherein each of said supporting bars has a T-shaped cross section.

3. The grid system of claim 1 wherein said cover holder further includes an elevation means for temporarily supporting at least one outside edge of said cover holder above an opposing member.

4. The grid system of claim 3 wherein said elevation means comprising an extensible bar being releaseably held by a bracket, said extensible bar and said bracket being shaped relative to one another to permit said extensible bar to be extended and retracted.

* * * * *